Aug. 16, 1932.   A. SABATH   1,871,742
AQUARIUM
Filed Aug. 28, 1931
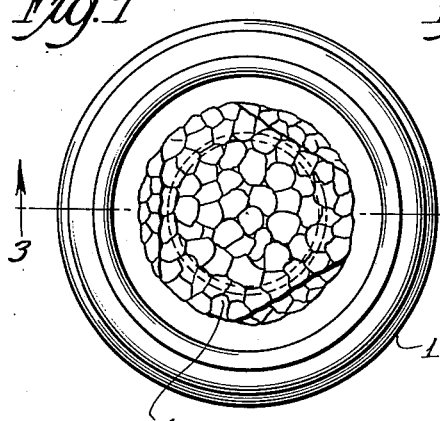
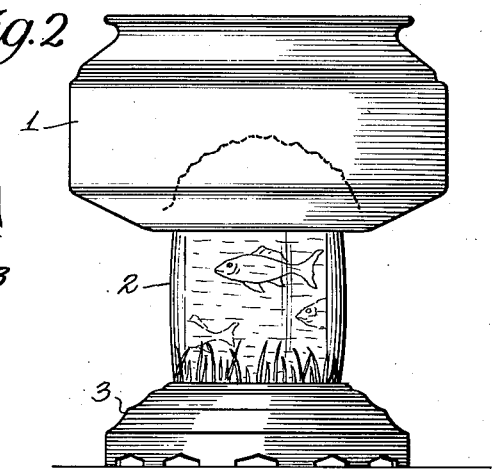
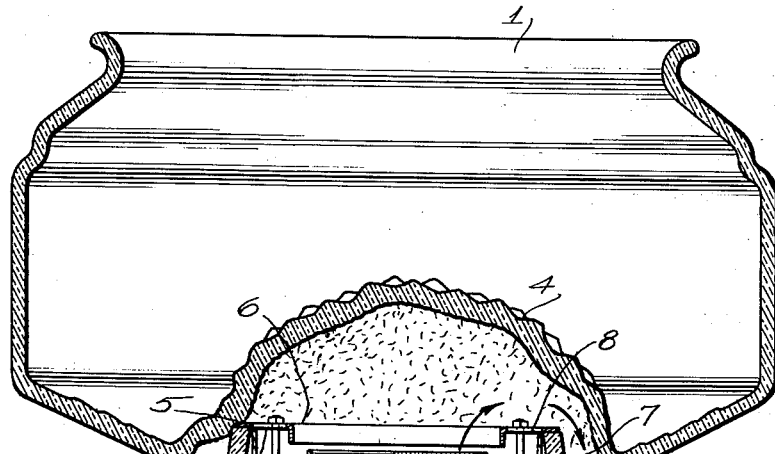
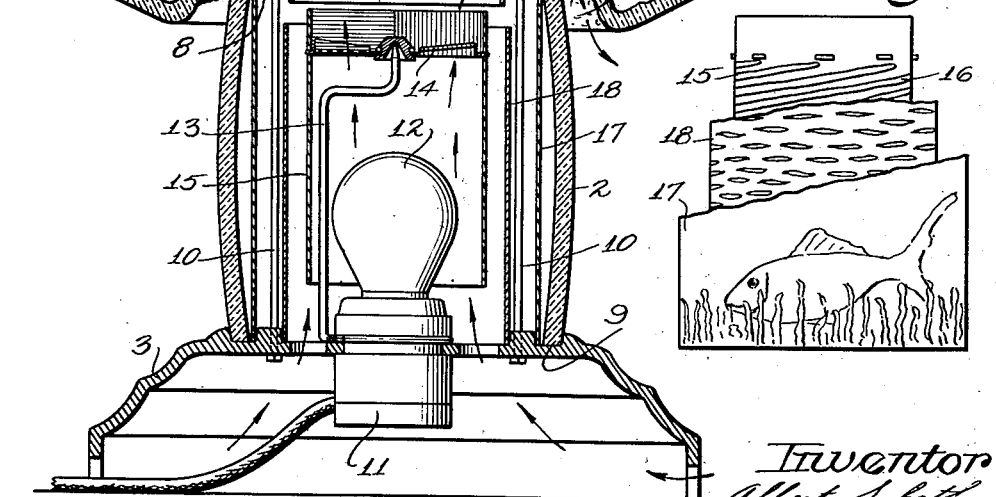
Witness:
Inventor
Albert Sabath,
By Fisher, Clapp, Soans & Pond
Attys.

Patented Aug. 16, 1932

1,871,742

UNITED STATES PATENT OFFICE

ALBERT SABATH, OF CHICAGO, ILLINOIS

AQUARIUM

Application filed August 28, 1931. Serial No. 559,956.

The main objects of this invention are to provide an improved form of aquarium; to provide an improved support for the aquarium; and to provide improved mechanism within the support for producing illuminated motion and color effects.

An illustrative embodiment of this invention is shown in the accompanying drawing, wherein:—
Figure 1 is a top plan of the improved device.

Figure 2 is a side elevation of the same.

Figure 3 is an enlarged vertical section, taken on the line 3—3 of Fig. 1.
Figure 4 is a side elevation, partly broken away, showing the two screens and the picture panel.

In the construction herein shown, the device comprises an improved aquarium 1 supported on the upper rim of a substantially cylindrical housing 2 which is mounted on a base 3 which also supports improved mechanism for producing illuminated motion and color effects.
The aquarium 1 comprises a transparent glass bowl, which may be blown in the usual manner and which has its bottom wall pressed upwardly to form a dome 4 for the housing 2. This dome 4 may be sculptured to represent rock formations, castles, or any other, object, for decorating the aquarium. Formed on the bottom of the dome 4 is a plurality of ledges 5 adapted to rest on an annular plate 6 which is supported on the upper rim of the housing 2. Recesses 7 are formed in the bottom of the aquarium to provide air passages to permit the flow of air through the housing. Ports 8 are formed in the annular plate 6 for the same purpose.
The housing 2 is preferably made of transparent glass and, if desired, certain of the pictorial representations may be applied to either face of this glass. This housing forms, in effect, a chimney for the rising air currents. The lower edge of this housing is seated in an annular groove 9 formed in the base 3 and the base and housing are secured together by bolts 10 passing through the base and the annular plate 6.
The base 3 may be designed in any suitable manner. Supported on this base is a socket 11 for an incandescent lamp 12. Also mounted on the base, is a standard 13 for supporting a fan 14 which carries a cylindrical screen 15 adapted to be rotated by the rising heated air. The fan vanes and the upper portion of the screen cylinder are translucent and variegated so that, upon rotation of the cylinder, intermittent colored rays of light are projected upwardly through the dome 4 to create a very beautiful effect within the aquarium.

The screen 15 has the usual slits or transparent portions 16.

Arranged within the housing 2 is a translucent cylindrical member 17 which bears the desired pictorial representations, as shown in Figs. 2 and 4. If desired, this member 17 may be omitted and the pictorial representations may be applied to the housing 2.

Located between the screen 15 and picture member 17 is an intermediate cylindrical screen 18 to produce the desired motion effects on the pictorial representations.

In operation, the rising heated air passing through the fan 14 rotates the cylindrical screen 15 for producing the desired motion effects on the pictorial representations and for simultaneously producing color effects within the aquarium. With this improved construction, a large number of different scenic and color effects may be produced.

If desired, instead of using the artificial illuminating mechanism below the aquarium, the dome 4 may be coated with a luminous paint.

I claim as my invention:

1. A device of the class described comprising a base, a translucent chimney on said base, a glass aquarium supported on the rim of said chimney, the bottom of said aquarium having a raised portion forming a translucent dome, illuminating means on said base, pictorial representations of aquatic objects adapted to be illuminated by said means, and a rotatable screen movable between said pictorial representations and said illuminating means, said screen having a variegated portion between said illuminating means and said dome.

2. A device of the class described comprising a base, a chimney supported on said base, a perforated plate supported on the upper rim of said chimney, bolts connecting said plate to said base for securing said chimney and base together, a translucent aquarium supported on said chimney, illuminating means mounted on said base within said chimney, and a rotatable screen in said chimney for producing illuminated motion effects.

ALBERT SABATH.